United States Patent [19]

Hammond et al.

[11] Patent Number: 4,646,896
[45] Date of Patent: Mar. 3, 1987

[54] DRIVE SYSTEM

[75] Inventors: John E. Hammond, Alcester; Peter T. Wooding, Birmingham, both of England

[73] Assignee: Lucas Industries Public Limited Company, Birmingham, England

[21] Appl. No.: 643,365

[22] Filed: Aug. 23, 1984

[30] Foreign Application Priority Data

Sep. 1, 1983 [GB] United Kingdom ............. 8323482

[51] Int. Cl.⁴ .................................... B60K 41/02
[52] U.S. Cl. ........................ 192/0.098; 192/48.3; 192/0.076; 192/103 R
[58] Field of Search ........... 192/0.096, 0.02 R, 0.084, 192/0.098, 48.3, 48.4, 87.14, 103 R, 0.076; 180/65.2, 65.3, 65.4; 74/665 A, 665 D, 675, 686; 361/242, 243

[56] References Cited

U.S. PATENT DOCUMENTS

| | | | |
|---|---|---|---|
| 3,367,438 | 2/1968 | Moore | 180/65.2 |
| 3,915,271 | 10/1975 | Harper | 192/0.098 X |
| 4,305,254 | 12/1981 | Kawakatsu et al. | 180/65.2 X |
| 4,400,997 | 8/1983 | Fiala | 180/65.2 X |
| 4,533,011 | 8/1985 | Heidemeyer et al. | 180/65.2 |

FOREIGN PATENT DOCUMENTS

| | | |
|---|---|---|
| 1917581 | 10/1970 | Fed. Rep. of Germany . |
| 2309680 | 2/1973 | Fed. Rep. of Germany . |
| 2258707 | 7/1974 | Fed. Rep. of Germany . |
| 321729 | 4/1975 | Fed. Rep. of Germany . |
| WO83/00464 | 2/1983 | PCT Int'l Appl. . |

OTHER PUBLICATIONS

European Search Report, Vienna 15-11-1984 (EP 84305672.2), Annex to the European Search Report on European Patent Appln. EP 84305672.

Primary Examiner—George H. Krizmanich
Attorney, Agent, or Firm—Stevens, Davis, Miller & Mosher

[57] ABSTRACT

A propulsion system for a vehicle provides for a drive shaft to be powered by an electric motor or an internal combustion engine, the motor being permanently coupled to the drive shaft and the engine engageable with the shaft by a clutch. Engine speed is matched with that of the drive shaft before engagement of the clutch by electrically loading the engine, preferably by coupling a generator to the engine and varying the generator field current. The clutch is automatically engaged when the speeds are equal.

14 Claims, 6 Drawing Figures

DRIVE SYSTEM

BACKGROUND OF THE INVENTION

This invention relates to a drive system for a and in particular to a system in which a vehicle may be propelled either by an electric motor or by an internal combustion engine.

In such a system it is commonly required to change from electrical to internal combustion power while the vehicle is running, and in known systems it has been the practice to match the engine and motor speeds by operating the engine throttle. However before the engine shaft is engaged with an output shaft of the system the response of the unloaded engine to throttle adjustments results in the engine speed hunting above and below its desired value. The consequent mismatch of the engine and motor speeds is likely to result in damage or severe wear to a clutch used to couple the engine to the output shaft.

SUMMARY OF THE INVENTION

According to the invention there is provided a drive system, comprising a main drive shaft for the vehicle, an internal combustion engine, a first clutch for coupling said engine to said drive shaft, means for electrically loading said engine to vary the speed thereof and means for actuating said first clutch only when the speeds of said engine and said shaft are substantially equal.

In one embodiment said means for coupling the engine to the drive shaft includes a rotor shaft of said motor.

In a preferred embodiment said engine speed is controllable by an electric generator, and there is provided means for varying the load applied to said engine by said generator.

In a particular embodiment said generator is connectable to charge said battery.

BRIEF DESCRIPTION OF THE DRAWINGS

An embodiment of the invention will now be described by way of example only and with reference to the accompanying drawings in which.

DETAILED DESCRIPTION OF PREFERRED EMBODIMENTS

Figure 1:
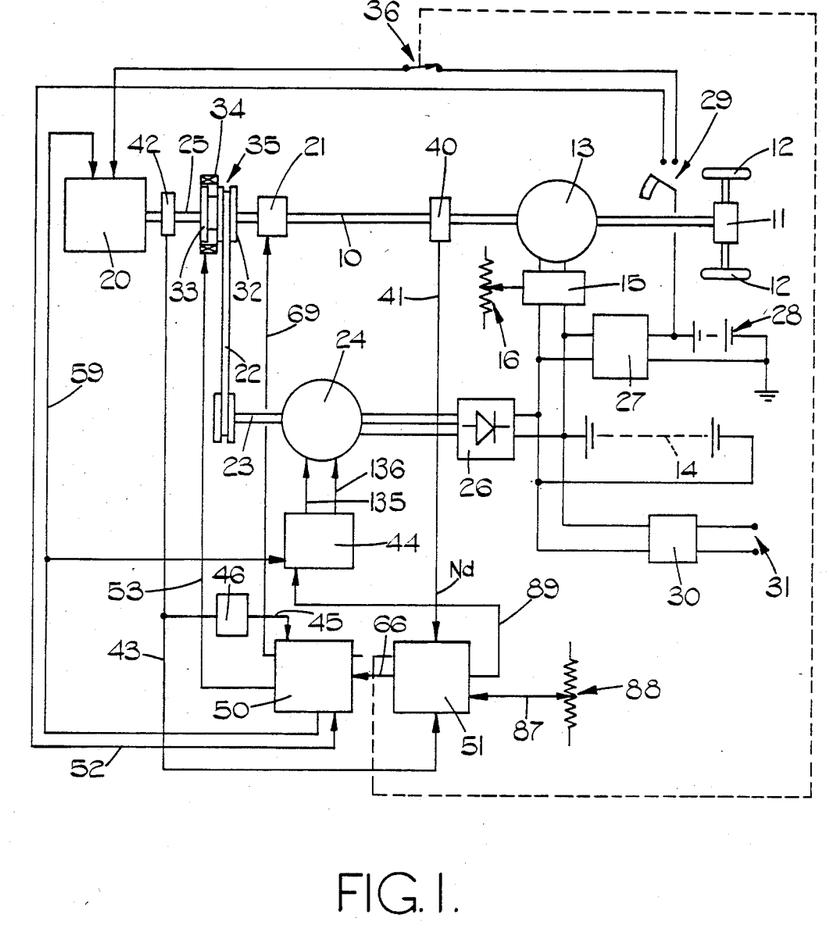
FIG. 1 is a diagram of a vehicle propulsion system according to the invention.

As shown in FIG. 1 a vehicle drive system includes a main drive shaft 10 which is connected through a known type of differential gear 11 to driving wheels 12 of the vehicle. Drivingly coupled to the shaft 10 is the rotor of an electric motor 13 which can be energised by a battery 14 by way of a control circuit 15. The speed of the motor 13 is adjustable by a suitable control 16.

An internal combustion engine 20 has an output shaft 25 which can be coupled to the shaft 10 by means of an electro-magnetic clutch 21. A non-slipping belt and pulley arrangement 22 is coupled to a further shaft 23. A three-phase alternator 24 is drivingly coupled to the shaft 23. The arrangement 22 includes a pulley 32 which is loose on the shaft 25. A plate 33 is drivingly coupled to the shaft 25. A stationary electromagnet 34 surrounds the pulley 32 and plate 33 and is energisable to urge the plate 33 and pulley 32 into frictional driving engagement. The pulley 32, plate 33 and electromagnet 34 combine to provide a further clutch 35. Output current from the alternator 24 is supplied to a rectifier circuit 26 whose output is connected across the battery 14.

The battery 14 comprises eighteen 12 volt battery units, providing 216 volts. A dc/dc converter 27 is connected across the output of the battery 14 for maintaining a charge on an auxiliary 12 volt battery 28 which can supply, inter alia, the starter and ignition circuits of the engine 20, through a switch 29. In its fully clockwise position the switch 29 supplies current to a starter (not shown) of the engine 20 through a switch 36.

A battery charging circuit 30 is also connected across the terminals of the battery 14 and can be connected to a 240 volt mains supply through terminals 31.

A transducer 40 is coupled to the shaft 10 and provides, on a line 41, a signal Nd corresponding to the speed of the shaft 10. A further transducer 42 is coupled to the shaft 25 and provides, on a line 43 a signal Ne corresponding to the speed of the engine 20. A limit detecting circuit 46 is responsive to the engine speed signal Ne on line 43 to provide a signal on a line 45 when the signal Ne exceeds a predetermined low value. A circuit 44 is shown in detail in FIGS. 4 to 6 and acts to regulate the field current of the alternator 24, and thereby the load imposed by the alternator 24 on the engine 20 when the clutch 35 is operated.

The propulsion system can be operated in at least five modes:

1. With the clutch 21 disengaged and the motor 13 energised by the battery 14 to drive the shaft 10.

2. With the clutch 21 disengaged, the battery 14 energising the motor 13 to drive the shaft 10, the engine 20 running and the clutch 35 engaged to drive the alternator 24 and thereby to maintain the charge of the battery 14 and to provide at least part of the current supply to the motor 13.

3. With the engine 20 running, clutch 21 engaged, clutch 35 disengaged and the motor 13 de-energised by means of its control circuit 15. In this condition the engine 20 is driving the shaft 10 directly and the rotor of the motor 13 acts, effectively, as a flywheel.

4. With the engine 20 running, the clutch 21 engaged and the motor 13 energised to drive the shaft 10. In this condition the engine 20 is supplementing the power output of the motor 13.

5. With the engine 20 running, the clutch 21 engaged and the motor 13 acting as a generator to charge the battery 14.

In any of operating modes 3, 4 or 5 above, the speed of the engine 20 is controlled in a conventional manner by a throttle operated by a pedal.

Operation in modes 3, 4 and 5 will usually be commenced when the vehicle is moving at a substantial speed. It is therefore necessary to match the speed of the engine 20 with that of the shaft 10 before the clutch 21 is engaged. Speed matching is effected by engaging the clutch 35 while the engine 20 is stationary, starting the engine, opening the engine throttle sufficiently to enable its speed to be raised to a level at which the clutch 21 can be operated, and varying the load applied by the alternator 24 to the engine 20, to cause operation of the clutch 21 by circuits 50, 51 shown in detail in FIGS. 2 and 3 respectively.

Figure 2:
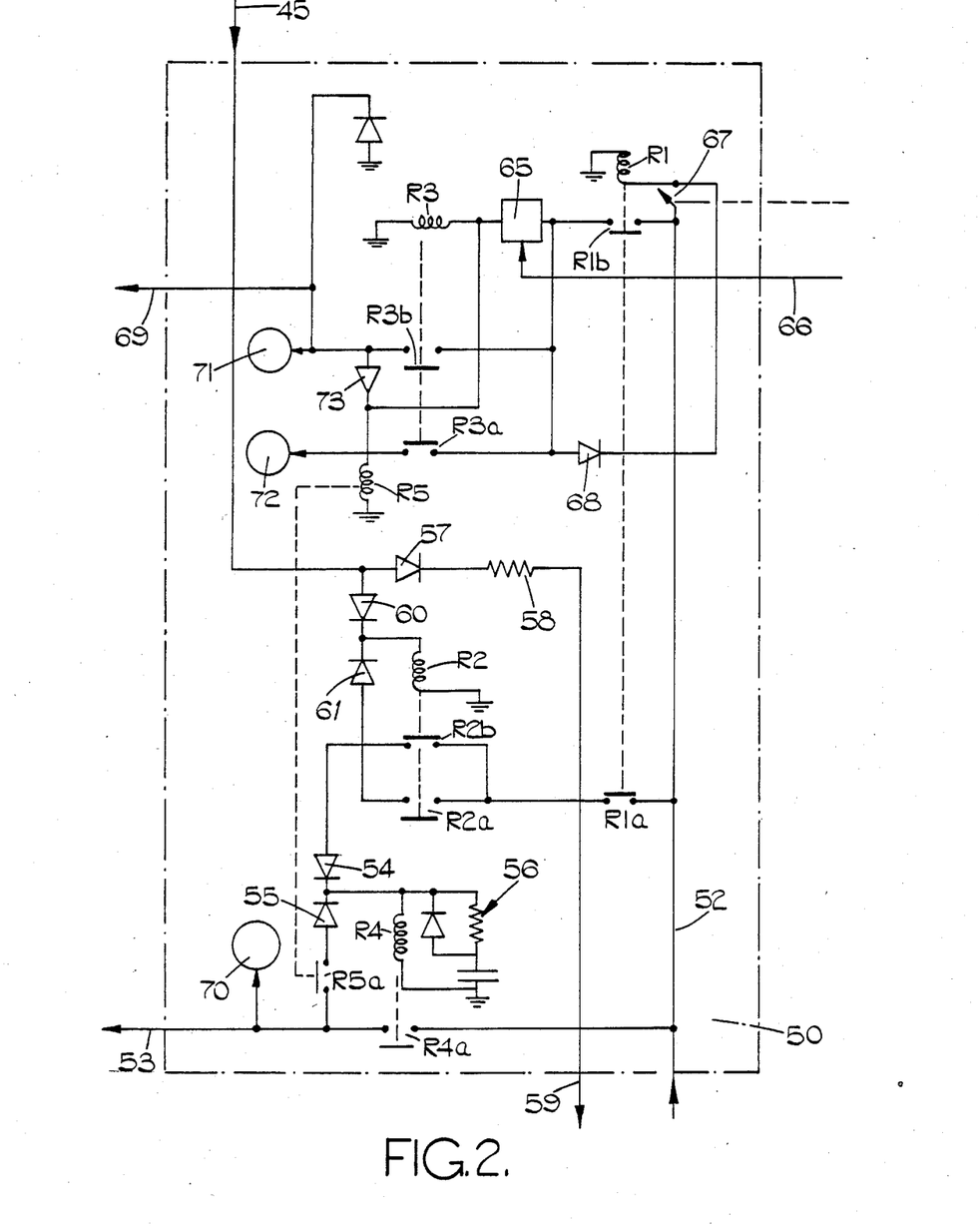
FIG. 2 is a diagram of a clutch control circuit forming part of FIG. 1.

As shown in FIG. 2 the circuit 50 includes a relay R1 having normally-closed contacts R1a and normally open contacts R1b. A further relay R2 has normally open contacts R2a and normally closed contacts R2b. A third relay R3 has normally closed contacts R3a and normally open contacts R3b. A fourth relay R4 has normally open contacts R4a and a fifth relay R5 has normally closed contacts R5a. When the engine ignition switch 29 (FIG. 1) is in its central, normally-running position a signal is provided on a line 52 to the circuit 50.

The line 52 is connected to the clutch 35 through a line 53, by way of the relay contacts R4a. The line 52 is also connected to the line 53 through a series arrangement of the contacts R1a, contacts R2b, diodes 54, 55 connected cathode to cathode and the contacts R5a. The relay R4 is connected in parallel with a RC delay circuit 56 to the junction between the diodes 54, 55. The line 45 is connected through a diode 57 and a resistor 58 to a line 59 connected to the ignition circuit of the engine 20. A series arrangement of two diodes 60, 61 connected cathode to cathode, the contacts R2a and contacts R1a are also connected between the line 45 and the line 52. The relay R2 is connected between earth and the junction of the diodes 60, 61. The relay R3 can be energised from the line 52 through the contacts R1b and a switch 65 arranged in series. The switch 65 is operable by a signal on a line 66 from the circuit 51 (FIG. 1). The line 52 can be connected to the relay R1 by means of a manually operable switch 67. Energisation of relay R1 closes contacts R1b and the relay R1 is thereafter maintained energised through a diode 68. The relay R5 is energisable from the line 52 through a series arrangement of the contacts R1b, R3b and a diode 73. The relay R5 is also energisable from the line 52 when the contacts R1b and the switch 65 are both closed. A line 69 to the clutch 21 (FIG. 1) communicates with the line 52 when the contacts R1b and R3b are both closed. Indicator devices 70, 71 are energised when signals are present on the lines 53, 69 respectively. A further indicator device 72 is energised when the relay R1 is latched on through the contacts R1b and diode 68.

Figure 3:
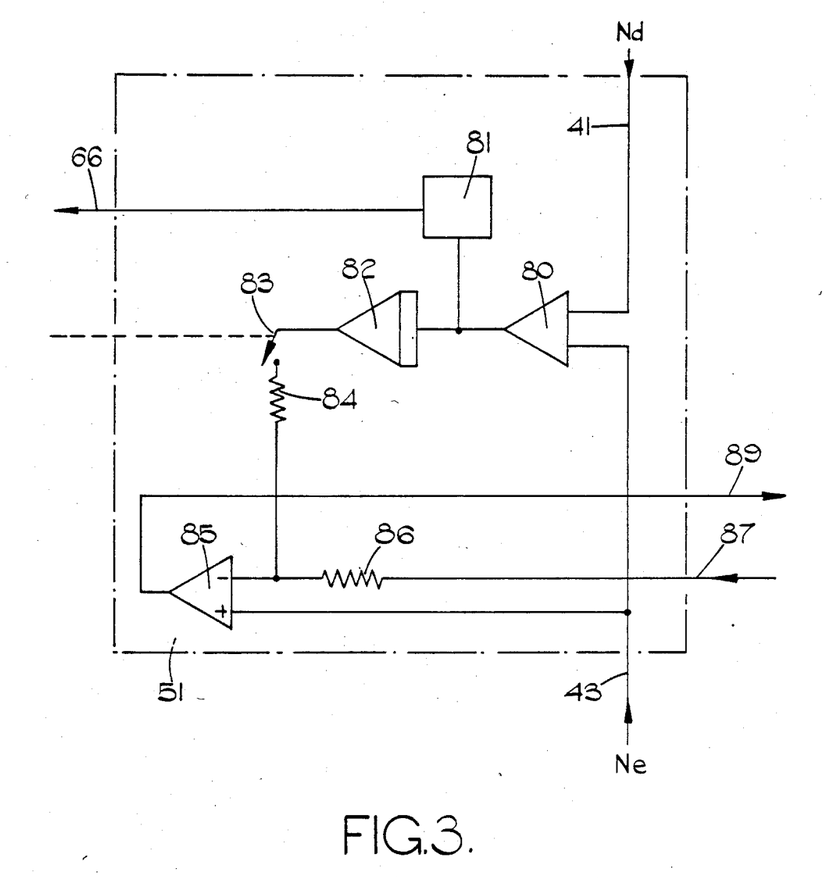
FIG. 3 is a diagram of a speed comparator circuit forming part of FIG. 1.

As shown in FIG. 3 the circuit 51 includes a differential amplifier 80 which is responsive to the signals Nd, Ne on lines 41, 43 respectively. An output signal from the amplifier 80 is supplied to a zero-level detecting circuit 81 which provides a signal on the lines 66 to the circuit 50 when the speeds of the drive shaft 10 and engine 20 are substantially equal. An alternative form of the device 81 provides a signal when a difference between these speeds is less than a predetermined amount. For example a signal may be provided on lines 66 when the speed of the engine 20 is less than one or two hundred rpm above or below that of the shaft 10. Output signals from the amplifier 80 are also supplied to a proportional plus integral amplifier 82 whose output is connected through a switch 83 and a resistor 84 to the inverting input of a further differential amplifier 85. The switch 83 is ganged with the switch 67 in the circuit 50 (FIG. 2) and the switch 36 in the line to the engine starter (FIG. 1), so these switches are operated at the same time and that when the switches 67, 83 are closed, the switch 36 is open. The inverting input of the amplifier 85 is also supplied, through a resistor 86, with an engine speed demand signal on a line 87 from a selector device 88 (FIG. 1). The non-inverting input of the amplifier 85 is supplied with the engine speed signal Ne on line 43. The output of the amplifier 85 forms a field current demand signal which is supplied on a line 89 to the control circuit 44 (FIG. 1) for the alternator 24, to regulate the alternator field current, and thereby the load imposed by the alternator 24 on the engine 20 when the clutch 25 is engaged.

If the propulsion system is operating in mode 1 above, and it is required to couple the engine 20 to the shaft 10 to operate in any of modes 3, 4 or 5, the switch 29 applies and maintains a signal on line 52 and subsequently starts the engine 20. Return of the switch 29 to its central position maintains the signal on the line 52. This signal passes through contacts R1a, R2b and diode 54 to operate the relay R4 and close the contacts R4a, the resulting voltage on line 53 energising the clutch 35 to couple the engine 20 to the alternator 24. When the engine speed signal Ne exceeds a predetermined low value limit detection circuit 46 provides a signal on line 45 which is applied through the diode 57 and resistor 58 to the line 59, to supply the ignition circuit of the engine 20. At the same time the control circuit 44 provides a field current to the alternator 24, thereby imposing a load on the engine 20. The signal on line 45 energises the relay R2 (FIG. 2), opening the contact R2b and shutting the contacts R2a. Since contacts R4a have been shut, relay R4 is maintained energised through the normally-closed contacts R5a and the diode 55. Closure of contacts R2a maintains the relay R2 energised through the diode 61.

The switch 67 is now operated to energise relay R1 from the supply on line 52, closing contact R1b and opening contact R1a. Relay R2 is nevertheless maintained energised by the signal on line 45 and relay R4 by the latch provided by contacts R4a, R5a. Closure of contacts R1b energises the indicating device 72 through the normally-closed contacts R3a, providing an indication that driving connection between the engine 20 and the shaft 10 has been selected, but has not yet occurred.

When the speed of the engine 20 is substantially equal to that of the shaft 10 the switch 65 is closed, energising relay R3 and closing the contacts R3b. The voltage signal on line 52 is then applied through line 69 to energise the clutch 21. Closure of contacts R3b also energises relay R5 through the diode 73, opening contacts R5a and de-energising relay R4. Contacts R4a open after a delay imposed by the circuit 56, causing the clutch 35 to be disengaged. The alternator 24 is, however, no longer required to load the engine 20, since speed matching has already occurred. Indicator device 72 is de-energised and device 71 is energised to show that the clutch 21 is engaged.

After the ganged switches 67, 83 in circuits 50, 51 respectively have been closed, but before the switch 65 is closed the speed of the engine 20 is varied by adjusting the load of the alternator 24 thereon, by means of the signal on line 87 from the speed selector device 88 (FIG. 1). As shown in FIG. 3 the engine speed signal Ne and the shaft speed signal Nd on lines 43, 41 respectively are applied to the amplifier 80 and any speed error is subjected to proportional plus integral amplification before being applied through the switch 83 and resistor 84 to the inverting input of the amplifier 85, to which input the signal on line 87 is also applied. The engine speed signal Ne is also applied to the non-inverting input of amplifier 85. The effect is that a required increase in engine speed results in the signal on line 89 being applied to the circuit 44 to reduce the field current of the alternator 24, and hence the load of the latter on the engine 20. When the speed signals Ne, Nd are equal, the resulting zero output from the amplifier 80 is detected by the circuit 81 and provides a signal on the line 66 to operate the switch 65, resulting in energisation of the clutch 21, as described above.

After the clutch 35 has been disengaged it is necessary to prevent the clutch 21 from being disengaged while the engine 20 is running, since the engine would then be unloaded and could overspeed. This requirement is met by the arrangement described, since if switch 67 (FIG. 2) is opened while the engine is running the relay R1 nevertheless remains energised through the contacts R1b and the diode 68. The contacts R3b are thus maintained shut by relay R3 and the clutch 21 remains energised.

Additionally, since relay R1 remains energised the contacts R1a are open. Contacts R4a are also open and the clutch 35 cannot be re-engaged with the engine 20 running.

In order to de-energise the relay R1 and disengage the clutch 21 it is necessary to operate the switch 29 to remove the voltage supply from line 52. If, with the switch 67 open the switch 29 is first operated to remove the voltage on line 52, de-energisation of relay R1 closes contacts R1a and opens contacts R1b. Relay R3 is de-energised, contacts R3a close and contacts R3b open, and clutch 21 is disengaged. If switch 29 is subsequently shut while the speed Ne of the engine 20 is above that required to provide the signal on line 45, relay R2 remains energised and contacts R2b are open. Relay R4 cannot therefore be energised through contacts R1a and the clutch 35 cannot be engaged while the engine speed Ne is above its predetermined low value.

The switch 36, being ganged to the switches 67, 83, prevents the engine 20 from being started when the switch 67 is closed, since if this occurred the clutch 21 would be engaged while the engine 20 was running unloaded by the alternator 24, by way of the clutch 35.

As described above the control circuit 44 controls the field current of the alternator 24 in accordance with the magnitude of the signal online 89. The circuit 44 comprises well-known circuit arrangements which operate in a known manner, and which do not of themselves form part of the invention. The circuit 44 will therefore be described only insofar as to enable its operation to be understood.

Figure 4:
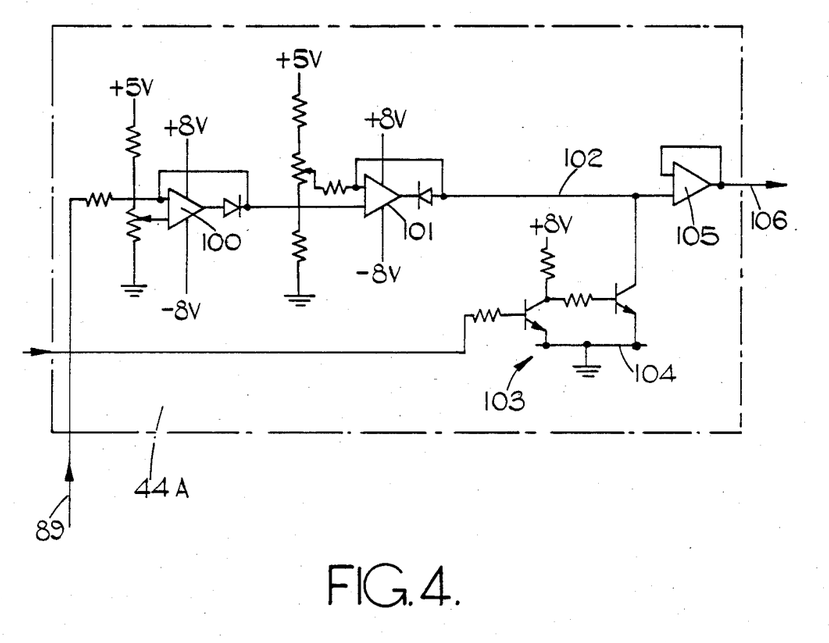
FIGS. 4, 5 and 6 show respective parts of a circuit forming part of the system of FIG. 1.
Figure 5:
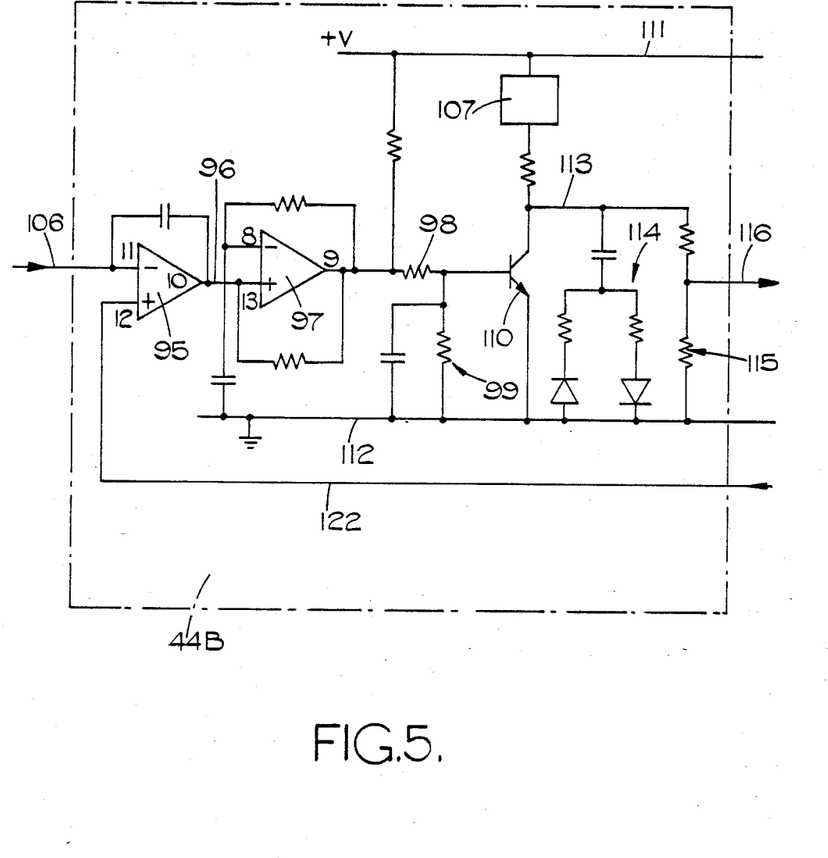
Figure 6:
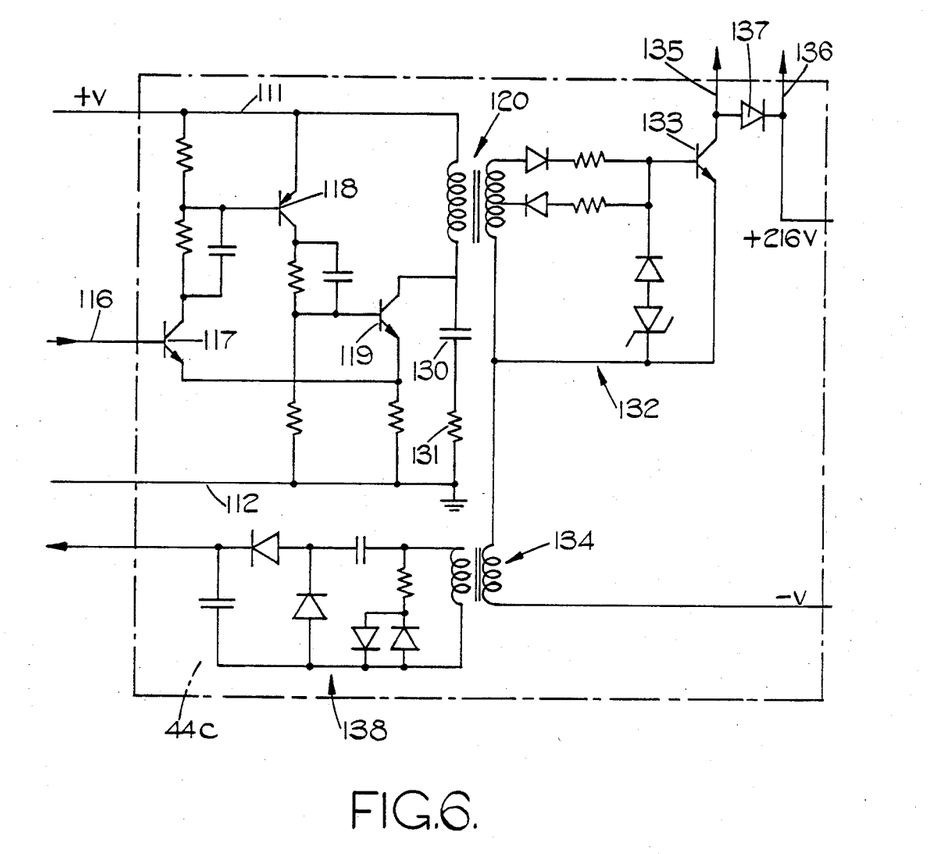

As shown in FIGS. 4, 5 and 6 the circuit 44 may be considered as comprising parts 44A, 44B and 44C. Part 44A is an amplifier stage responsive to the signal on line 89 from the circuit 51 (FIG. 3) and to the ignition voltage on line 59 (FIG. 1). Two amplifier. circuits 100, 101 respond to the signal on line 89 to provide a signal on a line 102. A semiconductor switch arrangement 103 is responsive to the ignition voltage signal on line 59, absence of this signal connecting the line 102 to an earth rail 104. A buffer circuit 105 is responsive to the signal on line 102 to supply a signal on a line 106 to the part 44B (FIG. 5).

As shown in FIG. 5 the signals on line 106 is applied to the inverting input of an amplifier 95 whose other input is connected to a feedback line 122. The amplifier 95 forms one element of an integrated circuit of the type available from Motorola under the designation MC3301, the numerals adjacent the amplifier indicating the terminals to which respective connections are made. The amplifier 95 has associated externally connected components to provide an integrating term and its output is supplied on a line 96 to an oscillator circuit 97 which also forms an element of the aforementioned Motorola integrated circuit.

The frequency of the output of oscillator 97 is dependent on the magnitude of the signal on line 96 and typically is in the range of 100 Hz to 1 KHz. The oscillator output is applied to the base of a npn transistor 110, through a resistor 98 which forms part of a resistor-capacitor network 99 connected between a +12 v rail 111 and an earth rail 112, and provides a suitable bias at the output of oscillator 97. The transistor 110 is connected between the rails 111, 112 through a +8 V regulating circuit 107 and the arrangement is such that a negative signal on the base of transistor 110 results in a positive voltage on a line 113. A diode, resistor and capacitor network 114 acts as a voltage pulse shaping circuit for the signals on line 113.

The signals on line 113 are applied through a potential divider 115 to a line 116 to the base of npn transistor 117 which is connected between the rails 111, 112 so that a positive signal on its base results in a low level signal on the base of a pnp transistor 118. Transistor 118 is connected between the rails 111, 112 so that in response to the low level signal on its base it provides a positive signal on the base of a npn transistor 119, causing the latter to conduct.

The transistor 119 is connected between the rails 11, 112 in series with the primary of a transformer 120. The transistors 117, 118, 119 and their associated capacitors and resistors comprise a voltage to current switching circuit which provides current pulses in the primary of the transformer 120, these pulses having the frequency of the oscillator circuit 97. A capacitor 130 and resistor 131 in series between the transformer primary and the rail 112 act to suppress voltage spikes.

The secondary winding of the transformer 120 is centre-tapped and is connected to a network 132 of resistors, diodes and zener diodes which shape the transformer output current pulses to provide drive pulses to the base of a power transistor 133, and also provide protection against excessive voltage on the base of the transistor 133. The transistor 133 is connected through the primary winding of a transformer 134 between the negative terminal of the 216 volt battery 14 (FIG. 1) and a lead 135 to the field winding of the alternator 24. A second lead 136 from the field winding is connected to the positive terminal of the battery 14. A diode 137 is connected between the lines 135, 136 so as to be reverse biased with respect to the dc voltage on these lines, and acts as a so-called "free-wheel" diode to maintain the field current during intervals when the transistor 133 is switched off.

As described the primary winding of the transformer 134 is connected in the −216 volt line. Switching of the transistor 116 in response to the pulses on line 115 results in current pulses through the primary of the transformer 120. These pulses have the frequency of the output of the oscillator 109 and are detected by the secondary of the transformer 134.

A resistor, capacitor and diode network 138 forms a compensated peak-to-peak detection circuit which provides a feedback signal on the line 122, this signal comprising a dc level proportional to the peak-to-peak magnitude of the current pulses through the primary of the transformer 134.

The arrangement is such that the magnitude of the signal on line 122 is dependent on the magnitude of the field current. An increase in the field current demand signal on line 106 results in an increase in frequency of the field current, and a signal corresponding to the increased current is fed back to the amplifier 95 on the line 122 to provide a new steady-state condition.

We claim:

1. A drive system, comprising a main drive shaft, an internal combustion engine, throttle control means for varying the speed of operation of said engine, a first clutch operable to couple said engine to said drive shaft, electrical means for loading and varying the speed of said engine, and control means for operating said first clutch only when the speeds of said engine and said shaft are substantially equal.

2. A system as claimed in claim 1 in which said electrical means for loading the engine comprises an electric generator and a driving connection between said engine and said generator.

3. A drive system comprising a main drive shaft, an internal combustion engine, throttle control means for varying the speed of operation of said engine, a first clutch operable to couple said engine to said drive shaft, electrical means for loading and varying the speed of said engine, and control means for operating said first clutch only when the speeds of said engine and said drive shaft are substantially equal, wherein said electrical means for loading the engine comprises an electrical generator and a driving connection between said engine and said generator wherein said driving connection is provided by a second clutch.

4. A system as claimed in claim 2 or claim 3 in which said control means includes means for generating a first control signal dependent on a difference between desired and sensed values of engine speed, and which includes a field current regulator for said generator, said field current regulator being responsive to said first control signal.

5. A system as claimed in claim 3 in which said second clutch is electrically operable and which includes a first switching device operable to energise said second clutch.

6. A system as claimed in claim 5 which includes means responsive to the speed of the engine for maintaining said first switching device operated to energise said second clutch when said engine speed exceeds a predetermined value.

7. A system as claimed in claim 6 in which said control device includes a control circuit for providing a second control signal when the speeds of said engine and said drive shaft are substantially equal, said first switching device being responsive to said second control signal to de-energise said second clutch.

8. A system as claimed in claim 7 in which said first clutch is electrically energisable to couple said engine to said drive shaft and which includes further switching devices responsive to said second control signal to energise said first clutch.

9. A system as claimed in claim 7 or claim 8 which includes means for modifying said second control signal in response to the speed of said drive shaft.

10. A drive system, comprising a main drive shaft, an internal combustion engine, throttle control means for varying the speed of operation of said engine, a first clutch operable to couple said engine to said drive shaft, electrical means for loading and varying the speed of said engine and control means for operating said first clutch only when a difference between the speeds of said engine and said shaft does not exceed a predetermined amount.

11. A method of connecting an internal combustion engine to a drive shaft having a speed of rotation through a clutch, said engine including: a throttle control means for varying the speed of operation of said engine; electrical means for loading and varying the speed of said engine and control means for operating said clutch to engage said engine and said drive shaft, said method comprising the steps of:
adjusting said throttle control means such that in an unloaded state said speed of operation of said engine is greater than said drive shaft rotation speed;
loading said engine by said electrical means so as to reduce the engine speed; and
operating said clutch to engage said engine and said drive shaft when said engine speed is substantially equal to said drive shaft speed.

12. A method of connecting an internal combustion engine to a drive shaft having a speed of rotation through a clutch, said engine including: a throttle control means for varying the speed of operation of said engine; electrical means for loading and varying the speed of said engine and control means for operating said clutch to engage said engine and said drive shaft, said method comprising the steps of:
adjusting said throttle control means such that in an unloaded state said speed of operation of said engine is greater than said drive shaft rotation speed;
loading said engine by said electrical means so as to reduce the engine speed; and
operating said clutch to engage said engine and said drive shaft only when a difference between the speeds of said engine and said drive shaft does not exceed a predetermined amount.

13. The method according to claim 11 or claim 12, wherein said means for loading said engine comprises an electric generator and a driving connection between said engine and said generator, said driving connection being provided through a second clutch, and said control means includes means for generating a first control signal dependent upon a difference between desired and sensed values of engine speed, and which includes a field current regulator for said generator, said field current regulator being responsive to said first control signal, said loading step comprising comparing said engine speed with said drive shaft speed and where any difference exceeds a predetermined value, said second clutch is engaged and said field current is increased thereby loading the engine and slowing its speed of operation such that said difference is less than said predetermined value.

14. The method according to claim 13, wherein said engaging step includes the step of disengaging said second clutch.

* * * * *